United States Patent [19]
Brown et al.

[11] 4,036,613
[45] July 19, 1977

[54] ROTARY SWEEP ARM FOR SELF-CLEANING FILTER APPARATUS

[75] Inventors: William E. Brown; Clyde M. Smith, both of Nashville, Tenn.

[73] Assignee: Woods Metal Company, Inc., Nashville, Tenn.

[21] Appl. No.: 717,516

[22] Filed: Aug. 25, 1976

[51] Int. Cl.² .............................................. B01D 46/04
[52] U.S. Cl. ........................................ 55/294; 15/418; 15/419
[58] Field of Search .............................. 55/294–296, 55/299, 301, 293; 15/415 A, 416, 418, 419; 210/392, 393, 407

[56] References Cited

U.S. PATENT DOCUMENTS

| | | | |
|---|---|---|---|
| 1,995,651 | 3/1935 | Rathbun | 55/294 |
| 2,601,704 | 7/1952 | Streun | 55/294 |
| 3,337,898 | 8/1967 | Schmid et al. | 55/293 |
| 3,545,180 | 12/1970 | Schrag | 55/294 |
| 3,757,496 | 9/1973 | Berg | 55/293 |
| 3,887,344 | 6/1975 | Smith | 55/296 |

Primary Examiner—Frank W. Lutter
Assistant Examiner—David L. Lacey
Attorney, Agent, or Firm—Harrington A. Lackey

[57] ABSTRACT

A rotary sweep arm for a self-cleaning filter apparatus in which the nozzle of the sweep arm is provided with a plurality of radially spaced vanes adjustable for equalizing the vacuum along the radial extent of the sweep arm.

9 Claims, 8 Drawing Figures

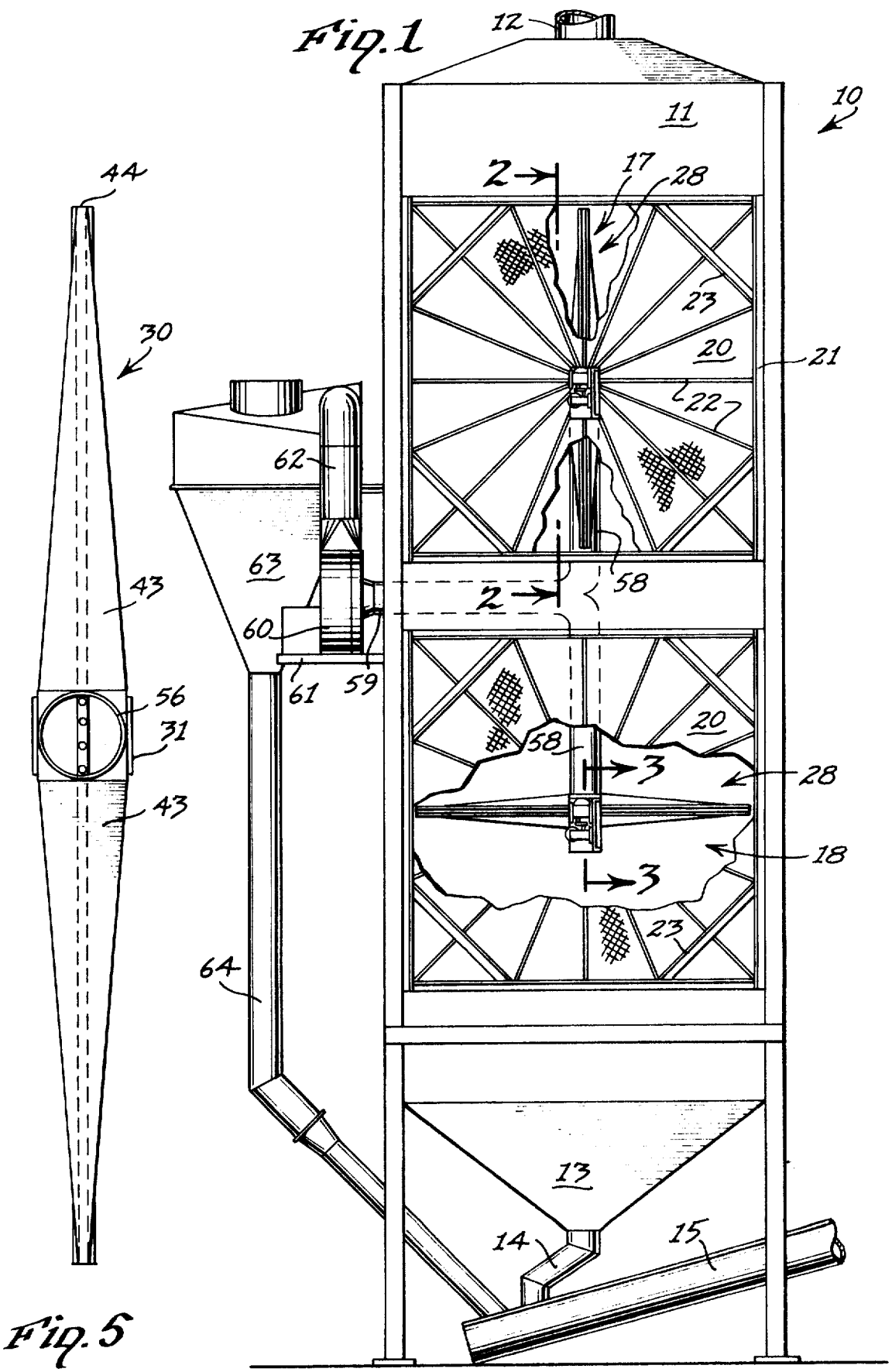

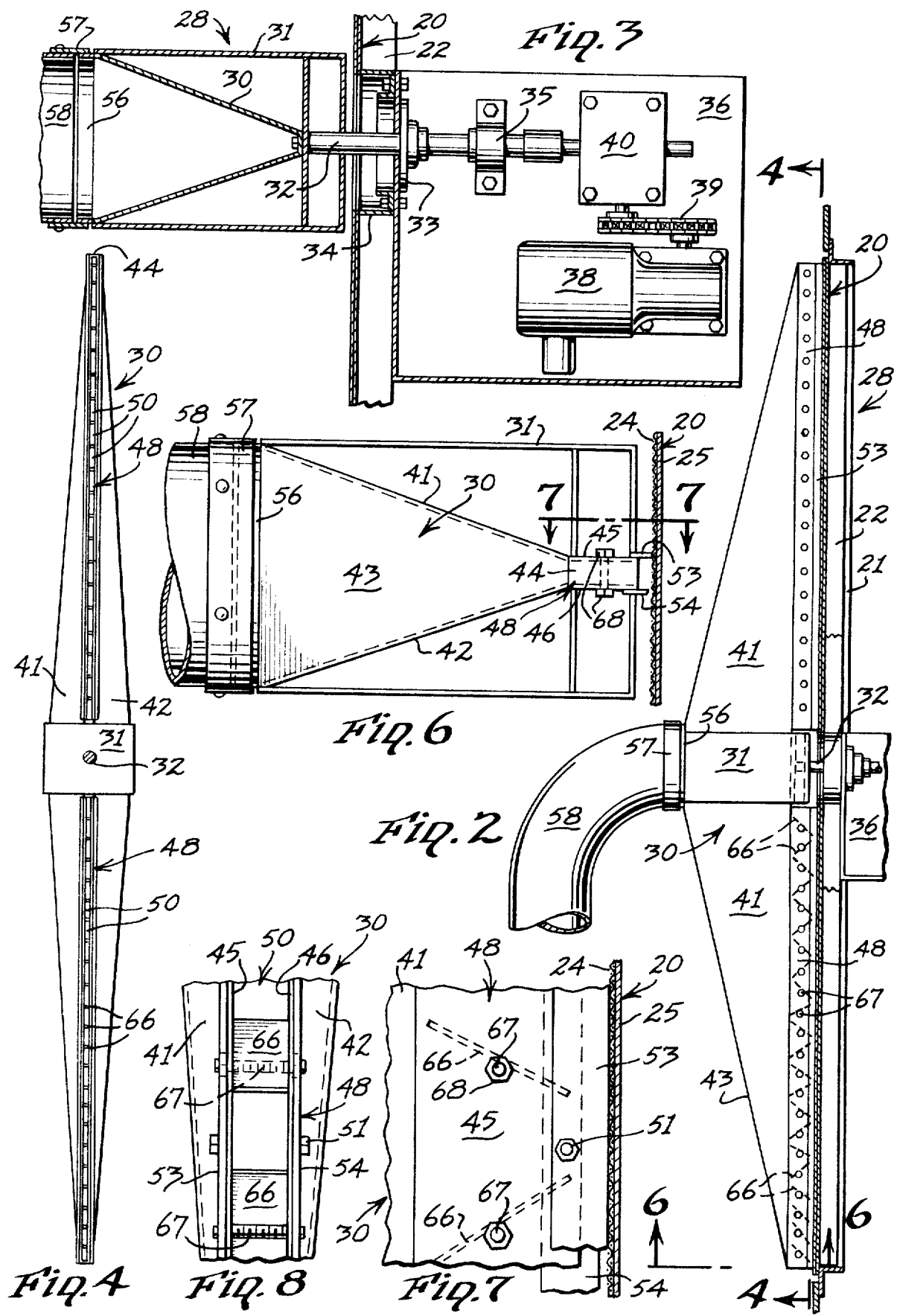

ROTARY SWEEP ARM FOR SELF-CLEANING FILTER APPARATUS

BACKGROUND OF THE INVENTION

This invention relates to a self-cleaning filter apparatus, and more particularly to a rotary sweep arm for a self-cleaning filter apparatus.

Rotary sweep arms having vaccum or suction heads for cleaning screen-covered ports are well-known in the art, as illustrated in the Noland U.S. Pat. No. 3,377,780, Streun U.S. Pat. No. 2,601,704, British Pat. No. 1,155 dated Jan. 16, 1906 and in British Pat. No. 343,085, dated Nov. 13, 1929.

The Noland patent discloses that it is old to employ a rotary vacuum sweep in a self-cleaning filter apparatus for a grain dryer.

Nevertheless, none of the rotary sweep arms disclosed in any of the above patents are provided with any means for creating a uniform vacuum along the radial extent of the nozzle of the sweep arm. In sweep arms of uniform dimension, greater suction is more likely to be applied closer to the rotary axis, with the vacuum decreasing radially outward from the rotary axis. Accordingly, the cleaning effect will be greater closer to the center of the rotary sweep and least efficient at the radial tips of the sweep arm.

SUMMARY OF THE INVENTION

It is therefore an object of this invention to overcome the above enumerated disadvantages by providing in a self-cleaning filter apparatus a rotary sweep arm having a radial nozzle adapted to establish a uniform vacuum along the radial extent of the nozzle in order to create uniform cleansing of the filter or screen.

More specifically, the rotary sweep arm contemplated by this invention includes a nozzle which extends the full radius or the full diameter of the rotary swath and is provided with a plurality of adjustable vanes for regulating the suction openings in the nozzle throughout its radial or diametrical length.

Each radial nozzle preferably has a pair of side walls defining a radial slot. Between each pair of walls is a plurality of vanes each vane being mounted upon a transverse pin adapted to be rotated and locked to establish different angular positions of the vanes relative to the rotary axis. By adjusting each of the vanes, the suction openings throughout the radial extent of the nozzle slot are varied to increase or decrease the suction or vacuum at any one incremental area along the nozzle slot. By properly adjusting these vanes, the vacuum may be made substantially uniform throughout the radial extent of each nozzle.

BRIEF DESCRIPTION OF THE DRAWINGS

FIG. 1 is a front elevation of a grain dryer, with portions of the screen members broken away to show two of the self-cleaning apparatus made in accordance with this invention;

FIG. 2 is an enlarged, fragmentary section taken along the line 2—2 of FIG. 1;

FIG. 3 is an enlarged, fragmentary section taken along the line 3—3 of FIG. 1;

FIG. 4 is a section taken along the line 4—4 of FIG. 2;

FIG. 5 is a rear elevation of the rotary sweep arm, detached from the exhaust duct;

FIG. 6 is an enlarged, fragmentary section taken along the line 6—6 of FIG. 2;

FIG. 7 is an enlarged, fragmentary section taken along the line 7—7 of FIG. 6; and FIG. 8 is a fragmentary front elevation of the portion of the sweep arm shown in FIG. 7.

DESCRIPTION OF THE PREFERRED EMBODIMENTS

Referring now to the drawings in more detail, FIG. 1 discloses a typical grain dryer 10 including a housing 11 having a grain inlet duct 12, a grain discharge bin 13 and a discharge outlet 14. The dried grain is discharged through the outlet 14 into a screw conveyor 15 for removal of the dried grain to another station, not shown, for further distribution or processing.

The particular housing 11 includes an upper air outlet opening 17 and a lower air outlet opening 18 in one wall of the housing 11. Each of the openings 17 and 18 is covered with a screen member 20 retained in a rectangular frame 21 and braced from the outside by radial stiffener members 22 and corner braces 23. Each of the screen members 20 is preferably formed of an interior fine screen 24 backed by an exterior coarse screen 25, such as an expanded metal member.

The aperture size of the screen member 20 is such as to permit the exhaust from the housing 11 of the warm air used to dry the grain within the housing 11, but to prevent the discharge of solid particles, such as chaff and dirt from the interior of the housing 11.

The self-cleaning apparatus 28, made in accordance with this invention, is designed to clean the interior surface of the fine screen 24 of any solid particles which may adhere to the interior screen surface, and therefore to prevent clogging of the screen member 20.

The self cleaning apparatus 28 includes an elongated hollow sweep arm 30 having a pair of radial arm sections extending diametrically of its central rotary axis and mounted upon a hub bracket 31. Fixed to the hub bracket 31, and secured to the sweep arm 30, is a rotary driven shaft 32 journaled in bearing 33 supported in bearing bracket 34 fixed at the center of the radial stiffener members 22. The rotary shaft 32 is further supported in front bearing 35 fixed to the mounting bracket or plate 36 attached to the stiffener members 22 in front of the screen member 20. The rotary shaft 32 is driven by a synchronous gear motor 38 through a chain and sprocket transmission 39 and gear reducer 40, all of which are mounted upon mounting plate 36.

Each radially extending section of the diametrical hollow sweep arm 30 includes a pair of side walls 41 and 42 which converge forward as best disclosed in FIGS. 3 and 6. The radial sections of sweep arm 30 also comprise rear walls 43, the edges of which join the rear edges of the side walls 41 and 42. The rear wall 43 as well as the side walls 41 and 42 also converge from the rotary axis radially outward to the opposite tips of the sweep arm 30, as best disclosed in FIGS. 4 and 5. The radial extremities of each of the rear walls 43 terminate in rectangular end walls 44. The converging edges of the side walls 41 and 42 terminate in a pair of forward projecting, parallel side walls 45 and 46. Thus, the parallel side walls 45 and 46 and the end walls 44 define a pair of diametrically aligned radial nozzles 48 having radially extending, narrow elongated openings or slots 50.

Projecting forward from opposite sides of the slots 50, and fixed to the opposite side walls 45 and 46 of each nozzle 48 by fasteners such as nuts and bolts 51, are a pair of flexible, resilient, radially extending wipers 53 and 54. The wipers 53 and 54 are preferably made of rubber, and the trailing wiper 53 projects slightly farther forward than the leading wiper 54, to permit the leading wiper 54 to pass over most of the debris upon the screen member 20, while the trailing wiper 53 tightly engages, and even flexes, as it passes over the inner surface of the fine screen 24.

The rear central portion of the hollow sweep arm 30 terminates in an annular collar 56. The annular collar 56 is rotatably received within a flexible sealing sleeve 57 which is fixed circumferentially about the inlet end of a fixed suction duct 58.

As best disclosed in FIG. 1, the suction ducts 58 from both apparatus 28 join a single main suction duct 59, which is connected to a suction fan 60 mounted on the platform 61 fixed to the outside of the housing 11. The discharge duct 62 from the suction fan 60 is connected to a conventional cyclone separator 63. The outlet duct 64 for the solid particles separated from the cyclone 63 leads to the screw conveyor 15.

The side walls 41 and 42 and the rear wall 43 of the rotary arm sections are tapered for several reasons. It will be noted, particularly in FIGS. 3 and 6, that the cross-sections of the hollow arm 30 are almost triangular, thereby providing one of the strongest type of truss configurations.

Furthermore, all of the walls 41, 42 and 43 taper from the center, or the rotary axis, radially outward, thereby providing the stronger and heavier truss section closer to the center of the sweep arm 30 than at the tips. The amount of material in the walls 41, 42 and 43, such as sheet metal, decreases radially outward, thereby gradually reducing the mass to be driven through the rotary swath of the hollow arm 30, plus concentrating the mass toward the center of the arm 30. Accordingly, less power will be required to drive the arm 30.

Another reason for the radially outward converging walls 41, 42 and 43 is to form radially tapering plenum chambers to provide a more nearly uniform air flow through the slots 50 along the radial extent of each of the nozzles 48.

Thus, the radial tapering walls 41, 42 and 43 of the rotary sweep arm sections reduce the stresses and mass of the sweep arm, provide fewer dynamic problems and less driving power, as well as providing a more nearly uniform air distribution for the suction nozzles 48.

In order to provide additional controls for maintaining uniform vacuum or suction along the entire radial extent of each of the nozzles 48, a plurality of rectangular vanes 66 are pivotally mounted at uniformly spaced radial intervals within each of the nozzles 48. Each of the vanes 66 is fixed to a pin 67 extending transversely of the slotted nozzle 48. Each pin 67 is journaled in the opposed side walls 45 and 46 for manual adjustment and pivotal movement of each of the vanes 66 relative to the rotary axis of the arm 30, or to the flow of air drawn through each of the nozzles 48. At least the outer end portions of each of the pivot pins 67 is threaded to receive nuts 68. The nuts 68 may be manually tightened upon the ends of the pins 67 in order to lock or set the corresponding vane 66 in a fixed angular position relative to the air flow direction or rotary axis of the drive shaft 32.

In a preferred form of the invention, since the suction is generally stronger toward the center of the sweep arm 30, the vanes 66 closest to the rotary shaft 32 are set at a greater angle to the rotary axis 32 than the vanes 66 toward the tips of the sweep arm 30, in order to partially close the nozzle slot closer to the rotary center of the arm 30. Usually, the angular setting of the vanes 66 gradually decreases from the center or rotary axis 32 radially outward toward the tips of the sweep arm 30. As best disclosed in FIG. 2, better control of smaller openings is obtained by alternately reversing the angles of the vanes 66 closer to the rotary axis, so that the openings between the vanes 66 may be pinched.

In the operation of the self-cleaning apparatus 28, grain of any desired type to be dried, such as corn, wheat, soy beans, peas, or other types of grains, are introduced through the inlet duct 12 into the housing 11, until the housing 11, the grain discharge bin 13 and the discharge outlet 14 are filled. The conventional heating or drying apparatus, not shown, is actuated to blow hot air into the bin 13, preferably from the opposite side of the housing 11 from the openings 17 and 18. The hot or warm air passes transversely through the grain and then out through the screen-covered openings 17 and 18. However, as the air passes through the screen members 20, the dust, dirt and chaff picked up by the air as it passes over the grains, collects upon the interior face of the fine screen 24 of the screen member 20.

Accordingly, the motor 38 is energized to drive the rotary shaft 32 and thereby the sweep arm 30 in a rotary direction and in a rotary swath adjacent to and parallel to the screen member 20. Both nozzles 48 sweep quite closely to the interior surface of the fine screen 24, and in fact the trailing wiper 53 engages this screen 24, not only to confine the suction air to the areas of the screen 24 opposed by each of the nozzles 48, but also to wipe and knock loose any solid particles which might be entangled with the mesh of the fine screen 24.

As the sweep arm 30 rotates over the interior screen surface, the suction fan 60 is actuated to draw air through the entire radial length of each nozzle 48, sucking into the hollow sweep arm 30 the chaff and debris collected upon the interior screen surface, and thence through the suction ducts 58 and 59 to the suction fan 60. The fan 60 then discharges the collected solid particles through the duct 62 into the cyclone separator 63. The separated particles in the cyclone 63 are then discharged by gravity through the discharge duct 64 into the same screw conveyor 15 into which grain is discharged from the housing 11 and discharge bin 13.

The reason the debris from the grain is returned to the grain is because the sole function of the apparatus 10 is to dry the grain and not to clean it. The grain and debris conveyed away by the screw conveyor 15 is transferred to another station where it is subsequently cleaned. Accordingly, it would not be economical to separately dispose of the waste solid particles from the cyclone 63.

If uneven areas of cleaning are noted on the interior screen surfaces of the screen members 20, then the motor 38 may be stopped and the vanes 66 manually set or re-set to provide more suction in the radial areas of least cleaning.

Since the annular length of any given rotary screen area cleaned by a set of vanes 66 is proportional to the radial distance of that particular set of vanes from the rotary axis or hub, proportionally greater suction per revolution is required of vane openings more remote from the center of the sweep arm 30. Thus, the tip portions of the nozzles 48 will have to clean a substantially greater area of the screen surface per revolution, or unit of time, than portions of the nozzles 48 adjacent the hub. By adjusting the angular position of the vanes 66, such as shown in the lower nozzle 48 of FIG. 2, uniform cleaning of the screen surface may be attained.

It will be understood that even if the radial sections of the hollow sweep arm 30 have uniform cross-sections throughout their radial length, that the vanes 66 incorporated in such sweep arm could also provide uniform suction along the radial extent of such arms, even though such arms would have other structural and dynamic disadvantages.

It will also be understood that the hollow sweep arm 30 might be a single radial arm or a plurality of radial arms instead of a pair of diametrically extending radial arm sections.

What is claimed is:

1. In a filter system including a housing having a gas inlet and a gas port which is covered by a screen member having an intake surface and an exhaust surface, a self-cleaning apparatus comprising:
   a. a hollow sweep arm having an elongated radial intake slot,
   b. exhaust means connected to said sweep arm for establishing a vacuum in said intake slot,
   c. drive means mounting said sweep arm for rotary movement on the intake side of said screen member, said intake slot being closely adjacent said intake surface so that the vacuum in said slot cleans said intake surface as said arm sweeps over said intake surface and
   d. adjustable vane means in said intake slot for regulating the vacuum along the radial extent of said intake slot.

2. The invention according to claim 1 in which said vane means comprises a plurality of vanes, means pivotally mounting said vanes about radially spaced axes transverse to the longitudinal axis of said intake slot.

3. The invention according to claim 2 in which each of said vanes is fixed to a transverse pin journaled for rotary movement about each of said corresponding transverse axes, and means for adjustable locking each of said pins in a stationary pivot position.

4. The invention according to claim 1 in which said vane means comprises a plurality of radially spaced vanes, each of said vanes being set at a different angle to the rotary axis of said sweep arm, said angles decreasing radially away from said rotary axis.

5. The invention according to claim 4 in which each of said vanes is fixed to a pin journaled transversely of said radial axis within said intake slot.

6. The invention according to claim 5 further comprising means for pivotally adjusting and holding said vanes in said respective angular positions.

7. The invention according to claim 6 in which said sweep arm comprises a radial nozzle having a pair of parallel radially extending walls spaced apart to form said intake slot, each of said rotary pins being journaled through said opposed walls and uniformly spaced along said radial axis, each of said vanes being rectangular and having a width substantially equal to the spacing between the interior surfaces of said walls.

8. The invention according to claim 7 in which said sweep arm further comprises a hollow hub in fluid communication with said exhaust means and a hollow plenum chamber projecting radially from said hub, in fluid communication with said hollow hub, and terminating in said nozzle.

9. The invention according to claim 8 in which said hollow plenum chamber comprises a pair of side walls and a rear wall, said side walls converging from said rear wall into said nozzle, and said rear wall converging from said hub radially outward toward said nozzle.

* * * * *